（12）United States Patent
King

(10) Patent No.: US 8,342,211 B2
(45) Date of Patent: Jan. 1, 2013

(54) PROTECTIVE PIPE COVER AND SUPPORT APPARATUS

(75) Inventor: Thomas Ross King, Vancouver (CA)

(73) Assignee: Fenix Energy Solutions Ltd., Vancouver (CA)

( * ) Notice: Subject to any disclaimer, the term of this patent is extended or adjusted under 35 U.S.C. 154(b) by 0 days.

(21) Appl. No.: 12/824,039

(22) Filed: Jun. 25, 2010

(65) Prior Publication Data

US 2011/0315260 A1 Dec. 29, 2011

(51) Int. Cl.
*F16L 3/00* (2006.01)

(52) U.S. Cl. ........ 138/106; 138/111; 138/115; 138/117; 104/275; D13/155

(58) Field of Classification Search .................. 138/106, 138/110, 111, 115–117, 108; 104/275; D13/155; 174/97, 135; D23/259
See application file for complete search history.

(56) References Cited

U.S. PATENT DOCUMENTS

| | | | | |
|---|---|---|---|---|
| 686,052 A * | 11/1901 | Golding | ........................... | 174/97 |
| 2,027,619 A * | 1/1936 | Rutherford | ..................... | 138/106 |
| 2,049,184 A * | 7/1936 | Walsleben | ..................... | 138/106 |
| 2,666,373 A * | 1/1954 | Mattson | ........................... | 404/16 |
| 2,885,460 A * | 5/1959 | Borresen et al. | ............ | 174/70 C |
| 3,118,017 A * | 1/1964 | Wimbish | ........................ | 174/97 |
| 3,724,148 A | 4/1973 | Bregenzer | | |
| 3,818,659 A * | 6/1974 | Anderson | ..................... | 52/220.5 |
| 3,965,967 A | 6/1976 | Jentzsch et al. | | |
| 4,101,100 A * | 7/1978 | Smith et al. | ............... | 244/114 R |
| 4,258,515 A * | 3/1981 | Owen | ............................. | 52/105 |
| 5,566,622 A * | 10/1996 | Ziaylek et al. | ................ | 104/275 |
| 5,988,227 A | 11/1999 | Magoffin | | |
| 6,079,898 A * | 6/2000 | St. Amant, III | ................ | 404/6 |
| 6,492,594 B1 * | 12/2002 | Magyar et al. | ................. | 174/97 |
| 6,668,573 B1 | 12/2003 | Gilsdorf | | |
| 6,747,212 B1 * | 6/2004 | Henry | .......................... | 174/101 |
| 7,309,836 B2 | 12/2007 | Lubanski | | |
| 7,394,025 B1 | 7/2008 | Wong | | |

(Continued)

FOREIGN PATENT DOCUMENTS

| EP | 1353129 A1 | 10/2003 |
|---|---|---|
| EP | 1428934 A1 | 6/2004 |

OTHER PUBLICATIONS

Enduro Composites, Channel type instrumentation tray, HTTP://www.endurocomposites.com/prime/html/products/cabletray/channel_type_instrument.html, Nov. 4, 2009.

(Continued)

*Primary Examiner* — Patrick F Brinson
(74) *Attorney, Agent, or Firm* — Laurence C. Bonar

(57) ABSTRACT

A protective pipe cover and support apparatus is disclosed that provides for secure attachment to an underlying surface, such as a concrete, tarmac or stone surface, for example, and which provides for secure retention and support of multiple pipes or other conduits within the pipe cover and protection of the pipes against loads, impacts and/or other forces applied to the pipe cover. The protective pipe cover includes a load bearing cover element with lateral load bearing supports which bear against an underlying surface, a curved outer web extending between the lateral supports, and a central load bearing support extending between the outer web and an underlying surface, and including an anchor for attachment to the surface. The pipe cover also includes a pipe support with multiple pipe retainer clips for resiliently retaining multiple pipes situated between the outer web of the load bearing cover element, and the underlying surface.

20 Claims, 7 Drawing Sheets

U.S. PATENT DOCUMENTS 7,810,197 B1 * 10/2010 Anthony .................. 14/69.5
2007/0246259 A1 10/2007 Lubanski

OTHER PUBLICATIONS

Vestil Manufacturing Corporation, Speed Bump, HTTP://www.vestilmfg.com/products/Idsol/car_stops.htm, Nov. 4, 2009.

International Road Dynamics Inc., Reflextor(TM) Rubber Speed Bumps, HTTP://www.irdinc.com/products/pdf/Reflextor_0608.pdf, Nov. 4, 2009.

B.E.S. Limited, Pipe Cover System, HTTP://www.bes.co.uk/products/137.asp, Nov. 4, 2009.

* cited by examiner

PROTECTIVE PIPE COVER AND SUPPORT APPARATUS

TECHNICAL FIELD

The present invention relates generally to apparati for covering and supporting pipes or similar elongated conduits. More particularly, the present invention relates to protective pipe cover and support apparati for protecting pipes from forces due to loads on top of the cover and impacts against the cover while providing for secure attachment to underlying surfaces.

BACKGROUND OF THE INVENTION

Over the years, the installation of pipes or other substantially linear conduits such as electrical cables, hoses, etc., extending across surfaces such as roadways, walkways, parking areas, and floors or walls of buildings or parking garages has become commonplace, particularly in applications where existing buildings and other structures are being upgraded or retrofitted, necessitating the installation of such pipes over existing surfaces. In particular, the installation of pipes or other conduits extending over existing surfaces such as roadways, walkways, parking areas and building or garage floors and walls may result in the exposure of such pipes to vehicular, pedestrian, or other traffic in the area of pipe installation that may pass over, impact against, or otherwise contact installed pipes, leading to potential damage. In particular, many types of pipes or other conduits may be susceptible to damage from forces exerted by vehicles or other loads passing over or resting on pipes which extend along a floor or horizontal surface for example, or from impacts by a vehicle or other object hitting or pressing against pipes which extend along a wall or other substantially vertical surface, for example. Accordingly, various types of pipe, cable or conduit covers and protectors have been developed and are known in the prior art to attempt to cover and provide protection from damage for pipes or other conduits which extend across a surface.

Conventional pipe or conduit covers and protectors known in the art may typically include one or more channels extending through the length of the protector in which one or more pipes and/or other conduits may be laid, and may also typically include one or more ramp or other inclined surfaces on either side of the channels to provide for vehicles or other loads to pass over the cover without directly loading or impacting the pipe or other conduit. However, many such conventional pipe or conduit covers and protectors are designed to be portable, such as for temporary use or for frequent relocation, and accordingly are not adapted to be securely or permanently attached to an underlying surface. Additionally, many such conventional pipe or conduit covers also may not provide for secure retention of pipes or conduits, which may simply be laid or draped in channels extending through the pipe or conduit protector.

In applications where pipes or conduits are desired to be installed permanently or semi-permanently as part of the construction, upgrade or retrofit of a building or other structure, it may be desired to be able to securely attach a pipe or conduit protector to an underlying existing surface, while still providing for the protection of the pipes or conduits from loads or impacts. Further in some applications where multiple pipes or other conduits are to be installed and protected from loads and impacts, or it may be desired to be able to keep individual pipes or conduits from contact with each other. Additionally, in some such applications, or applications where pipes or other conduits may be fragile or susceptible to shock, or for improved support of the pipes or other conduits, it may be desired to be able to securely retain the pipes or other conduits within the pipe cover, to prevent movement or damage from occurring inside the pipe cover. Accordingly, there remains a need for a pipe or other conduit cover and protector apparatus which addresses the shortcomings of the protectors known in the prior art.

SUMMARY OF THE INVENTION

It is an object of the present invention to provide a protective pipe cover and support apparatus that addresses some of the limitations of the prior art.

It is a further object of the invention to provide a protective pipe cover and support apparatus that addresses some of the limitations of the prior art and that can be securely attached to an underlying surface, such as a concrete, tarmac or stone surface, for example, and which desirably provides for secure retention and support of multiple pipes or other conduits within the pipe cover.

According to an embodiment of the present invention, a protective pipe cover apparatus for mounting to a surface is provided, comprising a load bearing cover element and a pipe support. The load bearing cover element comprises first and second lateral load bearing supports, a curved outer web extending between said first and second lateral supports, and a central load bearing support located substantially centrally between the first and second lateral supports and extending between the outer web and the surface. The central load bearing support comprises at least one anchor for attachment to the surface. The pipe support comprises first and second pipe retainer clips for resiliently retaining first and second pipes situated between the outer web of the load bearing cover element, and the surface. The first and second lateral load bearing supports of the load bearing cover element are adapted to bear against the surface.

According to another embodiment of the invention, a pipe cover apparatus for mounting to a surface is provided, comprising a load bearing cover element which comprises first and second lateral load bearing supports, a curved outer web extending between the first and second lateral supports, and a central load bearing support located substantially centrally between the first and second lateral supports and extending between the outer web and the surface. The central load bearing support comprises at least one anchor for attachment to the surface, and first and second pipe retainer clips for resiliently retaining first and second pipes situated between the outer web and the surface. The first and second lateral load bearing supports of the load bearing cover element are adapted to bear against the surface.

Further advantages of the invention will become apparent when considering the drawings in conjunction with the detailed description.

BRIEF DESCRIPTION OF THE DRAWINGS

The protective pipe cover and support apparatus of the present invention will now be described with reference to the accompanying drawing figures, in which.

Similar reference numerals refer to corresponding parts throughout the several views of the drawings.

DETAILED DESCRIPTION OF THE INVENTION

Figure 1:
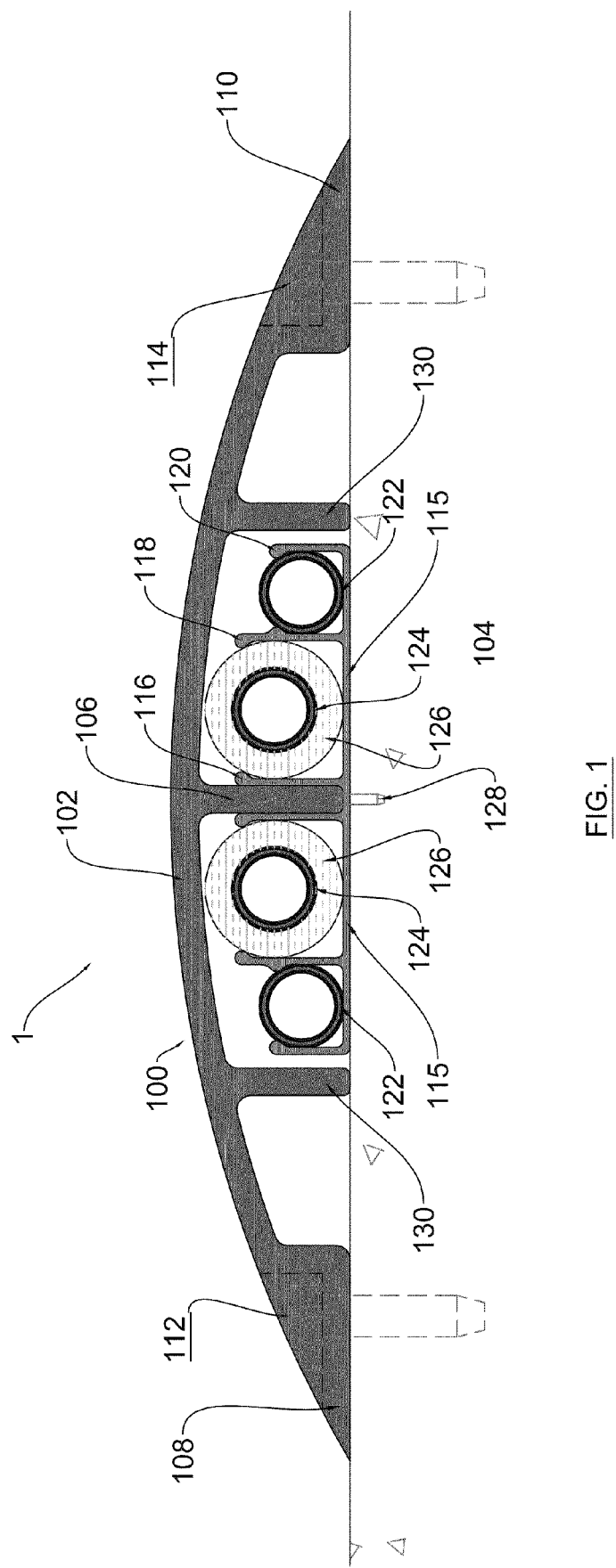
FIG. 1 illustrates a cross sectional view of an exemplary pipe cover according to an embodiment of the present invention.

The present invention will now be further described with reference to the Figures. FIG. 1 illustrates a cross sectional view of an exemplary pipe cover 1 according to an embodiment of the present invention. The pipe cover 1 comprises a load bearing cover element 100 which provides protection for multiple pipes, such as pipes 122 and 124 from impacts, loads and/or other forces applied to the pipe cover 1. The load bearing cover element 100 itself further comprises a curved outer web member 102 extending between first and second lateral supports 108 and 110 which are located at either end of the load bearing cover element 100. The pipe cover 1 illustrated in FIG. 1 is adapted for attachment to a substantially planar underlying surface, such as exemplary concrete surface 104. The first and second lateral supports 108 and 110 of the pipe cover 1 are adapted to bear against the underlying concrete surface 104, to enable the transfer of forces and loads applied to the load bearing cover element 100 to the underlying surface 104. Load bearing cover element 100 also comprises a central load bearing support 106 situated at substantially the center of curved outer web 102. The central load bearing support 106 extends between the outer web 102 and the underlying concrete surface 104, and is operable to transfer loads, impacts and/or other forces applied to the outer web 102 of the cover element 100 to the underlying surface 104, and to support the outer web 102 while the pipe cover 1 is under load. The central load bearing support 106 additionally comprises at least one anchor 128 for securely attaching the pipe cover to the underlying concrete surface 104. The pipe cover 1 further comprises at least one pipe support 115 which comprises multiple and desirably resilient pipe retainer clips such as 116, 118 and 120, to resiliently retain multiple pipes such as pipes 122 and 124 between the outer web member 102 and the underlying concrete surface 104.

The pipe cover 1 illustrated in FIG. 1 desirably provides for protection of multiple pipes, such as pipes 122 and 124, from impacts, loads and other forces which may be applied to the load bearing cover element 100. In one embodiment, the pipe cover 1 may be adapted for installation on a hard underlying surface 104 such as a concrete, asphalt or stone surface, for example. In such a case, the pipe cover 1 may be exposed to impacts and/or loads or other forces such as may result from the passage of wheeled vehicles over top of the pipe cover 1, or from vehicles impacting or otherwise striking pipe cover 1, such as may occur in a driveway, roadway, parking lot, parking garage, or on a surface within a building, for example, where vehicles may pass over or impact against the pipe cover 1. The pipe cover 1 may also be exposed to other loads and/or impacts applied to the load bearing cover 100 such as may occur from the placement and/or dropping of heavy objects onto the pipe cover 1, or from people, animals or other loads passing over and/or pressing or impacting against the pipe cover 1. Accordingly, the pipe cover 1 may desirably prevent damage or dislodgement of pipes 122, 124 which might otherwise occur without protection.

In a first embodiment according to the invention, pipes 122 and 124 may comprise geothermal pipes 122 and 124, and pipe cover 1 may be adapted for application to protect geothermal pipes 122 and 124 on top of hard underlying surface 104 such as concrete or asphalt which may be adjacent to or within an existing building. Examples of such an application may include protecting geothermal pipes which run through underground, basement or parkade parking areas within or adjacent to a building, or roadways or driveways adjacent to a building where vehicle traffic passes, such as may occur in retrofit geothermal heating, cooling and/or power generation applications to existing buildings or structures. In such geothermal pipe protection applications, geothermal pipes 122 and 124 may comprise known types of piping commonly used for conducting water, water/glycol, refrigerant or other geothermal working fluids, and may comprise geothermal pipes made of materials such as copper, aluminum or other metal, or plastic, polyvinyl chloride or PEX, for example. In one embodiment, geothermal pipes 122 and 124 may comprise conventional geothermal exchange or "geoexchange (GX)" piping such as may contain water or predominantly water-based geothermal exchange working fluids. In another optional embodiment, geothermal pipes 122 and 124 may alternatively comprise direct expansion geothermal exchange or "DX" piping such as may contain refrigerant-based geothermal exchange working fluids such as R410A refrigerant fluid, for example, in which case in one such embodiment pipes 122 and 124 may comprise pressurized refrigerant piping such as copper pressurized piping, for example. In another embodiment, geothermal pipes 122 and 124 may comprise both conventional geoexchange and direct expansion geoexchange piping, as may be used in hybrid or dual-mode geothermal installations, for example, in which case pipes 122 and 124 may comprise pipes of differing construction and dimensions.

In such geothermal applications, some pipes, such as geothermal pipes 124 may comprise an external layer of insulation material 126 such as to prevent transfer of heat into or out of pipe 124 and the geothermal working fluid it contains. In such applications, pipe support 115 may desirably comprise resilient pipe clips 116, 118 and 120 which are sized and spaced so as to provide secure resilient support to geothermal pipes 122 and 124 of differing external dimensions, such as may be due to internal pipe dimensions used, or to dimensions of external insulation layers such as insulation 126 on pipe 124, for example. In one embodiment pipe clip 115 may comprise a single component retaining two pipes 122 and 124 on either side of central load bearing support 106. In an alternative embodiment, pipe clip 115 may comprise two component pieces, each piece resiliently retaining a pair of pipes 122 and 124 on one side of central support 106.

It should be noted that the external dimensions of geothermal or other pipes 122 and 124 may vary significantly depending upon the application, as is known in the art, and therefore in any embodiments of the present invention, the size of pipe support 115 and pipe clips 116, 118, 120, as well as the overall dimensions of pipe cover 1 and its elements including but not limited to cover element 100, outer web 102, central support 106, lateral supports 108 and 110, and optional auxiliary supports 130, may also be varied and scaled as required to provide cover and protection of pipes 122 and 124 located between the underlying surface 104 and outer web 102.

In another embodiment according to the invention, load bearing cover element 100 of pipe cover 1 may further comprise at least one auxiliary load bearing support 130 situated between central load bearing support 106 and at least one of the lateral supports 108 and 110. Each such auxiliary load bearing support 130 extends between the outer web member 102 and the underlying surface 104 to provide additional structural support to the outer web 102. Auxiliary load bearing supports 130 are similar in function to central load bearing support 106 and are operable to transfer loads, impacts and/or other forces applied to the outer web 102 of the cover element 100 to the underlying surface 104, and to support the outer web 102 while the pipe cover 1 is under load. In a particular embodiment, auxiliary load bearing supports 130 may be located substantially symmetrically on either side of central support 106, and substantially adjacent to the lateral ends of pipe support 115, so as to provide structural and load bearing support to the outer web 102 in the critical area where pipes 122, 124 are located under the outer web 102, thereby desirably increasing protection of pipes 122, 124 from loads, impacts and/or other forces applied to outer web 102.

In a particular embodiment according to the invention, at least one of lateral supports 108 and 110 may optionally include an anchor, such as anchors 112 and 114, to securely attach the pipe cover 1 to the underlying surface. Such lateral anchors 112 and 114 are operable to complement the centrally located anchor 128 for providing secure attachment of the pipe cover 1 to the underlying surface. Additionally, optional lateral anchors 112 and 114 may further desirably improve the transfer of loads, impacts and/or other forces applied to lateral supports 108 and 110 of load bearing cover element 102 to the underlying surface 104, relative to embodiments without anchors 112 and 114 located at lateral supports 108 and 110. Optional lateral anchors 108 and 110 are also desirably operable to reduce potential lateral flexing and/or shifting of pipe cover 1 due to lateral components of forces applied to the lateral support portions 108 and 110 of cover element 100 such as may be applied by wheeled vehicles or other loads rolling or otherwise progressing laterally from one side of pipe cover 1 to the other. In the case of a pipe cover 1 for use in protecting pipes in an area where wheeled vehicles or other equipment may pass laterally over pipe cover 1, lateral supports 108 and 110 may be desirably smoothly curved to meet the underlying surface 104 in a substantially smooth transition, such as to facilitate the rolling of vehicle wheels over the pipe cover 1 for example. In such applications, optional lateral anchors 112 and 114 may also be desirably recessed into lateral supports 108 and 110 so as to provide a substantially smooth curved outer surface of cover element 100, to additionally facilitate the smooth rolling of vehicle wheels over the pipe cover 1.

Central anchor 128 as well as optional lateral anchors 112 and 114 may comprise any suitable known anchor means for securing pipe cover 1 to the underlying surface 104, and may desirably be selected for suitability and compatibility with the particular characteristics of the underlying surface to which the pipe cover 1 is to be attached. For example, in the case where surface 104 is a concrete surface, anchors 128, 112, and 114 may desirably comprise suitable concrete anchors, such as commonly known expandable bolt, or bonded bolt or other mechanical concrete anchors, for example. In the case of other types of underlying surfaces 104 such as asphalt or stone surfaces 104, for example, anchors 128, 112 and 114 may desirably comprise a suitable known anchor type adapted for secure attachment to asphalt or stone surfaces, respectively. In some embodiments, pipe cover 1 may additionally be adapted for use on other alternative types of underlying surfaces 104, such as wood, gravel, or ice, for example, in which case anchors 128, 112 and 114 may be selected from suitable known types of anchors for securing pipe cover 1 to such alternative types of underlying surfaces 104. In a particular embodiment, central anchor 128 and optional lateral anchors 112 and 114 may desirably be removable, so that pipe cover 1 may be removable from underlying surface 104 such as may be required for maintenance and/or replacement of pipes 122 and 124, or for relocating or removal of pipe cover 1 as may be required at some point after the pipe cover 1 is installed.

In one embodiment according to the invention, a pipe cover 1 as illustrated in cross-section in FIG. 1 may be provided in segments of any suitable or desired length, whereby the load bearing cover element 100 extends the full length of the segment, so as to provide protection for pipes 122, 124. In such an embodiment, the pipe support 115 may also extend the full length of the segment, to provide continuous resilient retention of pipes 122, 124 along the length of the segment such as may be desirable with flexible or fragile pipes, for example. Alternatively, pipe support 115 may comprise one or more discontinuous sections within the length of the segment, so as to provide resilient retention of pipes 122,124 at suitable intervals along the length of the segment, as may be required depending upon the desired application and properties such as rigidity and/or strength of the pipes, for example. Anchors 128, to anchor the pipe cover 1 to the underlying surface 104, and any additional or other anchors or attachment means such as optional lateral anchors 112 and 114, may also be provided at any desired interval along the length of pipe cover 1, such as one or more anchors per segment of pipe cover 1, for example, as may be required or suitable depending upon the desired application and any additional requirements for securing the pipe cover 1 to the underlying surface 104. Further, in an embodiment where pipe cover 1 is provided in segments, such segments may optionally comprise connection means (not shown) which may desirably be adapted to securely connect adjacent sections of pipe cover 1, to provide for continuous protection of pipes 122, 124. Such optional connection means may comprise any suitable known method of connection known in the art, such as but not limited to mechanical fasteners, interlocking tabs/slots or other locking arrangements, adhesive connection, etc. Alternatively, adjacent segments of pipe cover 1 may be secured in a continuous adjacent fashion solely by the attachment of each segment of pipe cover 1 to the underlying surface 104 by anchor means 128 and similar, for example.

The elements of pipe cover 1 may be constructed from any known materials suitable for use in the protection of pipes 122, 124 from loads, impacts and other forces which may be applied against the load bearing cover element 102. In an exemplary embodiment, the load bearing cover element 102, including lateral supports 108, 110 and central load bearing support 106 may desirably comprise one or more durable and resilient materials such as, but not limited to plastic, high impact polyvinyl chloride, fiber-reinforced plastic, fiberglass-reinforced plastic, carbon-reinforced plastic, high density rubber, and steel, for example. Further, pipe support 115 including pipe retainer clips 116, 118, 120, may desirably comprise one or more suitable resilient materials such as, but not limited to, plastic, polyvinyl chloride and metal, for example. In a particular embodiment, all components of the pipe cover 1 including cover element 102 and pipe support 115 may desirably be constructed from materials which are resistant to corrosion, salts and automotive fluids and chemicals, such as may be included in residues left by automobiles or other wheeled vehicles which may come into contact with pipe cover 1 in common applications such as in parkways, driveways, garages, parkades and other areas where vehicles travel or are stored. It should also be noted that in other embodiments in applications where expected loads and/or impacts upon pipe cover 1 may be relatively small, other potentially less durable and/or resilient materials may be used to construct at least portions of the elements of pipe cover 1, such as, but not limited to wood, composite, organic and/or cellulose based materials, for example.

Figure 2:
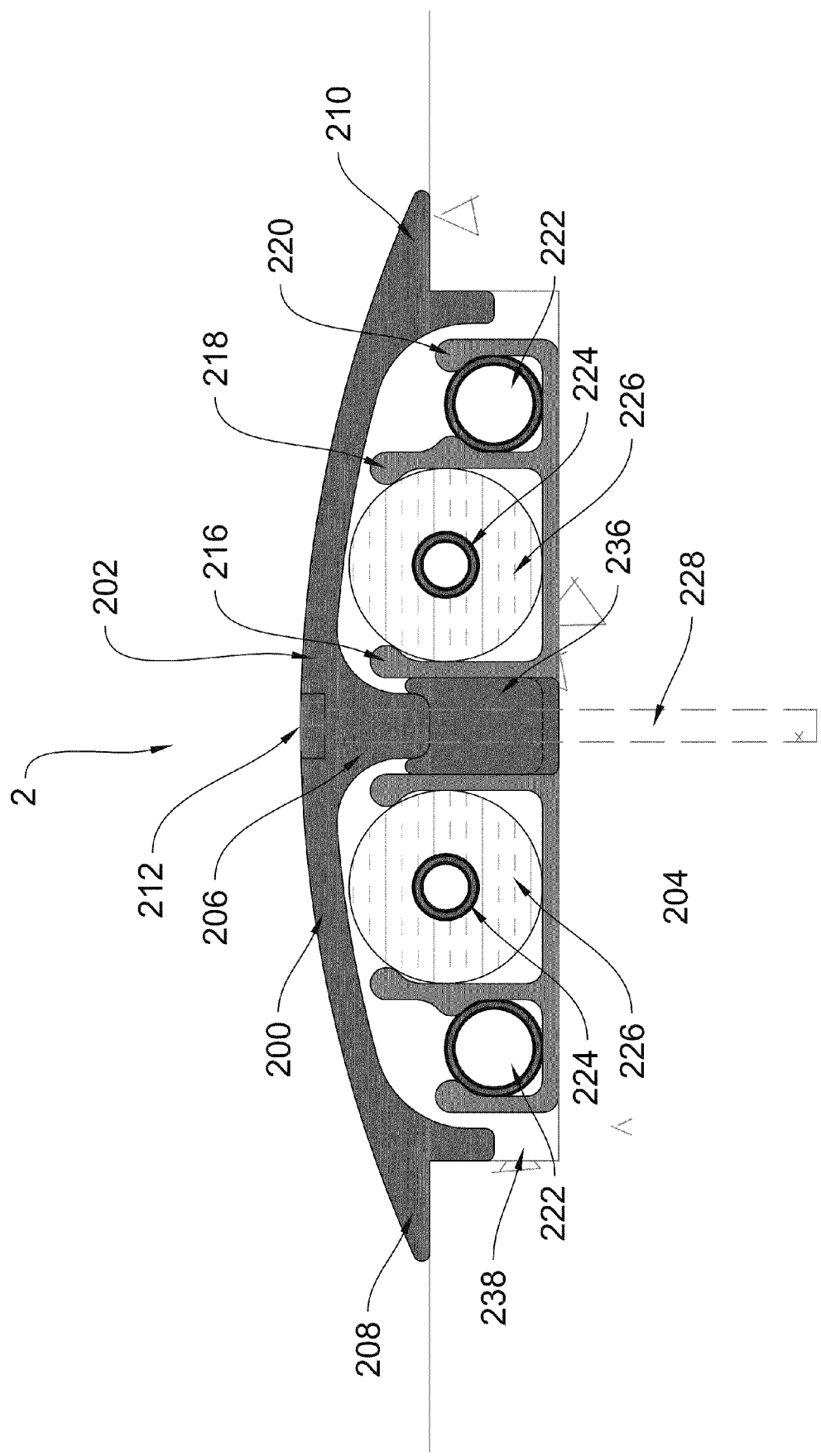
FIG. 2 illustrates a cross sectional view of a further exemplary pipe cover adapted for installation in a recess of an underlying surface, according to an embodiment of the invention.

Referring now to FIG. 2, a cross sectional view of an exemplary pipe cover adapted for installation in a recess of an underlying surface according to an embodiment of the invention, is shown. Similar to pipe cover 1 shown in FIG. 1, the pipe cover 2 of FIG. 2 comprises a load bearing cover element 200 which provides protection for multiple pipes, such as pipes 222 and 224 from impacts, loads and/or other forces applied to the pipe cover 2. The load bearing cover element 200 itself further comprises a curved outer web member 202 extending between first and second lateral supports 208 and 210 which are located at either end of the load bearing cover element 200. The pipe cover 2 embodiment illustrated in FIG. 2 is adapted for attachment within a recess 238 in an otherwise substantially planar underlying surface 204, such as exemplary concrete surface 204. The first and second lateral supports 208 and 210 of the pipe cover 2 are adapted to bear against the surface of the underlying concrete surface 204, on either side of recess 238, to enable the transfer of forces and loads applied to the load bearing cover element 200 to the underlying surface 204 adjacent to the lateral supports 208 and 210. Load bearing cover element 200 also comprises a central load bearing support 206 situated at substantially the center of curved outer web 202. The central load bearing support 206 extends between the outer web 202 and the underlying concrete surface 204, and is operable to transfer loads, impacts and/or other forces applied to the outer web 202 of the cover element 200 to the underlying surface 204, and to support the outer web 202 while the pipe cover 2 is under load. The central load bearing support 206 may optionally comprise an additional block component 236 which bears on underlying surface 204 to support outer web 202. The central support 206 also comprises at least one anchor 228 for securely attaching the pipe cover 2 to the underlying concrete surface 204. The pipe cover 2 further comprises at least one pipe support 215 which comprises multiple and desirably resilient pipe retainer clips such as 216, 218 and 220, to resiliently retain multiple pipes such as pipes 222 and 224 between the outer web member 202 and the underlying concrete surface 204.

Similar to the pipe cover 1 as described above in reference to FIG. 1, pipe cover 2 desirably provides for protection of multiple pipes, such as pipes 222 and 224, from impacts, loads and other forces which may be applied to the load bearing cover element 200 in installations over a recess 238 in an underlying surface 204, such as but not limited to concrete, asphalt or stone surfaces, for example. In many typical applications, the pipe cover 2 may protect pipes 222, 224 from impacts and/or loads or other forces such as may be applied to the load bearing cover element 202 by the passage of wheeled vehicles over top of the pipe cover 2, or from vehicles impacting or otherwise striking pipe cover 2, such as may occur in a driveway, roadway, parking lot, parking garage, or on a surface within a building, for example, where vehicles may pass over or impact against the pipe cover 2.

In a particular embodiment similar to as described above in reference to FIG. 1, pipe cover 2 may protect geothermal pipes 222, 224, which run in a recess 238 in hard underlying surface 204 such as a concrete or asphalt surface which may be adjacent to or within an existing building such as may occur in retrofit geothermal heating, cooling and/or power generation applications where geothermal pipes 222, 224 run through underground, basement or parkade parking areas within or adjacent to an existing building, or roadways or driveways adjacent to an existing building where vehicle traffic passes. In such geothermal piping applications, pipe support 215 may desirably comprise resilient pipe clips 216, 218 and 220 which are sized and spaced so as to provide secure resilient support to geothermal pipes 122 and 124 of differing external dimensions, such as may be due to internal pipe dimensions used, or to dimensions of external insulation layers such as insulation 126 on pipe 124, for example. It should be noted that similar to as described above in reference to FIG. 1, the external dimensions of geothermal or other pipes 222 and 224 may vary significantly depending upon the application, as is known in the art, and therefore in any embodiments of the present invention, the overall dimensions of pipe cover 2 and all its elements, including but not limited to cover element 200, and pipe clip 215, may also be varied and scaled as required to provide cover and protection of pipes 222 and 224 located between the recess 238 in underlying surface 204 and the outer web 202 of pipe cover 2.

Similar to as described above in reference to FIG. 1, central anchor 228 may comprise any suitable known anchor means for securing pipe cover 2 to the underlying surface 204, and may desirably be selected for suitability and compatibility with the particular characteristics of the underlying surface to which the pipe cover 2 is to be attached. For example, in the case where surface 204 is a concrete surface, anchor 228 may desirably comprise suitable concrete anchors, such as commonly known expandable bolt, or bonded bolt or other mechanical concrete anchors, for example. In a particular embodiment, central anchor 228 may desirably be removable, so that pipe cover 2 may be removable from underlying surface 204 such as may be required for maintenance and/or replacement of pipes 222 and 224, or for relocating or removal of pipe cover 2 as may be required at some point after installation.

Also similar to as described above in reference to FIG. 1, in one embodiment, pipe cover 2 may be provided in segments of any suitable or desired length, whereby the load bearing cover element 200 extends the full length of the segment, so as to provide protection for pipes 222, 224, whereas pipe support 215 may either extend the full length of the segment to provide continuous resilient retention of pipes 222, 224 along the length of the segment, or may alternatively comprise one or more discontinuous sections within the length of the segment, so as to provide resilient retention of pipes 222, 224 at suitable intervals along the length of the segment. Anchor 228 may also be provided at any desired interval along the length of pipe cover 2, such as one or more anchors per segment of pipe cover 2, for example, as may be required or suitable to secure pipe cover 2 to the underlying surface 204 for a desired application. In a particular embodiment where pipe cover 2 is provided in segments, such segments may optionally comprise connection means (not shown) which may desirably be adapted to securely connect adjacent segments of pipe cover 2 using any suitable known method of connection known in the art, such as but not limited to mechanical fasteners, interlocking tabs/slots or other locking arrangements, adhesive connection, etc. Alternatively, adjacent segments of pipe cover 2 may be secured solely by anchor 228 to the underlying surface 204.

Similar to as described above in reference to FIG. 1, the components of pipe cover 2 may be constructed from any known materials suitable for use in the protection of pipes 222, 224, and in an exemplary embodiment, the load bearing cover element 202, including lateral supports 208, 210 and central load bearing support 206 may desirably comprise one or more durable and resilient materials such as, but not limited to plastic, high impact polyvinyl chloride, fiber-reinforced plastic, fiberglass-reinforced plastic, carbon-reinforced plastic, high density rubber, and steel, for example. Further, pipe support 215 including pipe retainer clips 216, 218, 220, may desirably comprise one or more suitable resilient materials such as, but not limited to, plastic, polyvinyl chloride and metal, for example. In a particular embodiment, all components of the pipe cover 2 including cover element 202 and pipe support 215 may desirably be constructed from materials which are resistant to corrosion, salts and automotive fluids and chemicals, such as for applications such as in parkways, driveways, garages, parkades and other areas where vehicles travel or are stored.

Figure 3:
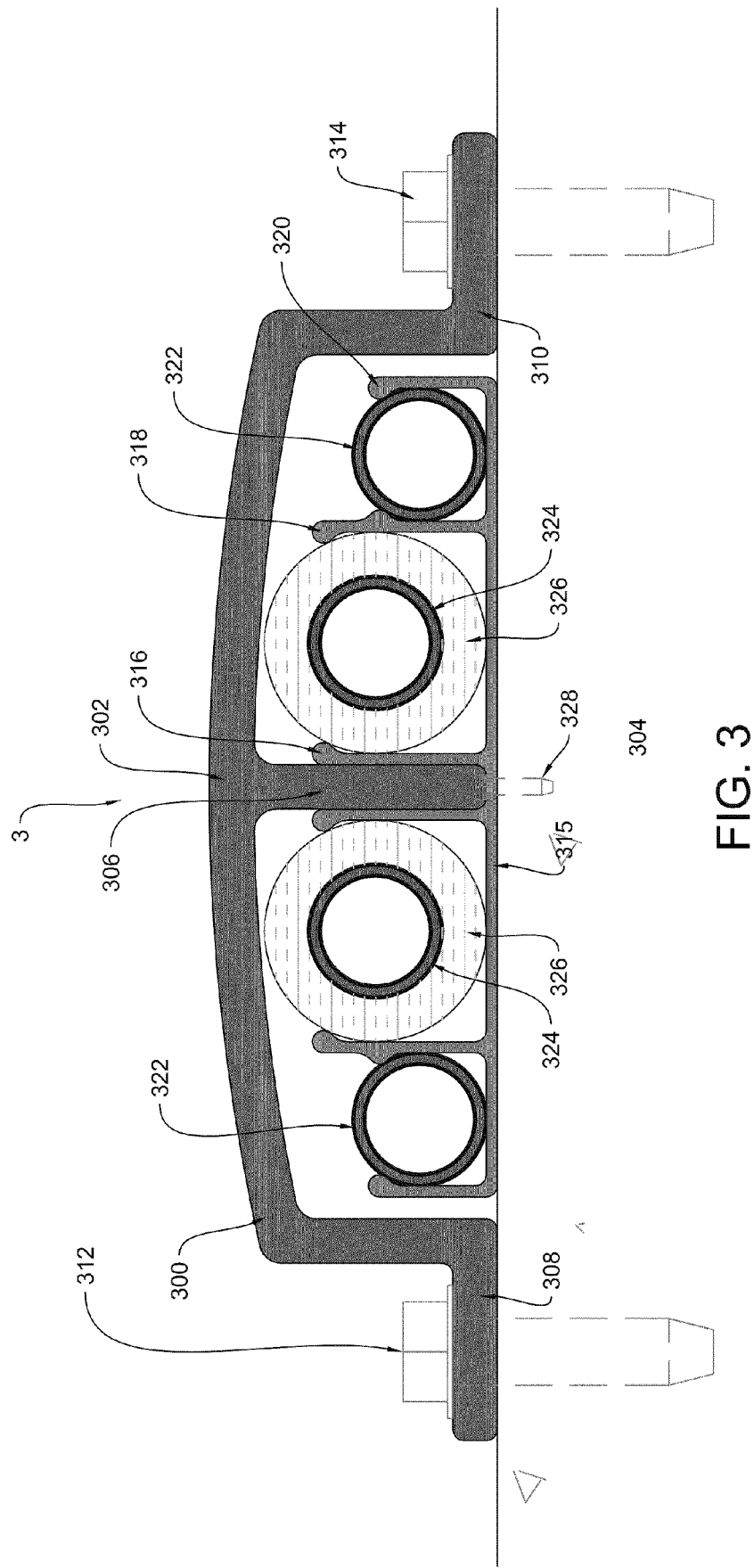
FIG. 3 illustrates a cross sectional view of an exemplary pipe cover adapted for wall installation, according to an embodiment of the invention.

Referring now to FIG. 3, a cross sectional view of an exemplary pipe cover adapted for wall installation, according to an embodiment of the invention, is shown. Similar to pipe cover 1 shown in FIG. 1, the pipe cover 3 of FIG. 3 comprises a load bearing cover element 300 which provides protection for multiple pipes, such as pipes 322 and 324 from impacts, loads and/or other forces applied to the pipe cover 3. The load bearing cover element 300 itself further comprises a substantially curved outer web member 302 extending between first and second lateral supports 308 and 310 which are located at either end of the load bearing cover element 300. However, the pipe cover 3 embodiment illustrated in FIG. 3 is desirably adapted for attachment to a wall or other substantially vertical and substantially planar underlying surface 304, such as exemplary concrete wall surface 304, such as may be used to protect pipes 322, 324 traversing vertically up or horizontally across a wall surface, for example. The first and second lateral supports 308 and 310 of the pipe cover 3 are adapted to bear against the surface of underlying concrete wall 304, to enable the transfer of impact forces and/or other loads applied to the load bearing cover element 300 to the underlying wall surface 304. Load bearing cover element 300 also comprises a central load bearing support 306 situated at substantially the center of curved outer web 302. The central load bearing support 306 extends between the outer web 302 and the underlying concrete wall surface 304, and is operable to transfer impact forces and/or other loads applied to the outer web 302, to the underlying wall 304, and to support the outer web 302 when the pipe cover 3 is subject to impact or otherwise under load. The central support 306 also comprises at least one anchor 328 for securely attaching the pipe cover 3 to the underlying concrete wall 304. The pipe cover 3 further comprises at least one pipe support 315 which comprises multiple and desirably resilient pipe retainer clips such as 316, 318 and 320, to resiliently retain multiple pipes such as pipes 322 and 324 between the outer web member 302 and the underlying concrete wall surface 304. Lateral supports 308 and 310 may also optionally comprise lateral anchors 312 and 314 respectively, to additionally secure pipe cover 3 to underlying wall surface 304 at the lateral supports 308 and 310.

Similar to the pipe cover 1 as described above in reference to FIG. 1, pipe cover 3 desirably provides for protection of multiple pipes, such as pipes 322 and 324, from impact forces and other loads which may be applied to the load bearing cover element 300 in installations on a substantially vertical wall surface 304, such as but not limited to concrete or stone wall surfaces, for example. In many typical applications, the pipe cover 3 may protect pipes 322, 324 from significant impacts and/or other loads such as may be applied to the load bearing cover element 302 by automobiles or other vehicles impacting or otherwise striking pipe cover 3, such as may occur in installations on interior or exterior walls of buildings or structures in vehicle parking lots, parkades, garages and/or warehouses, for example.

In a particular embodiment similar to as described above in reference to FIGS. 1 and 2, pipe cover 3 may protect geothermal pipes 322, 324, which run vertically up or horizontally along a concrete building wall surface 304 such as a concrete interior or exterior wall of an existing building as may occur in retrofit geothermal heating, cooling and/or power generation applications where geothermal pipes 322, 324 run along a concrete wall of an underground, basement or parkade parking area within a building, or an exterior parking area directly adjacent to an exterior building wall surface, for example. In such geothermal piping applications, pipe support 315 may desirably comprise resilient pipe clips 316, 318 and 320 which are sized and spaced so as to provide secure resilient support to geothermal pipes 322 and 324 of differing external dimensions, such as may be due to internal pipe dimensions used, or to dimensions of external insulation layers such as insulation 326 on pipe 324, for example.

Similar to as described above in reference to FIG. 1, central anchor 328 and optional lateral anchors 312 and 314 may comprise any suitable known anchor means for securing pipe cover 3 to the underlying wall surface 304, and may desirably be selected for suitability and compatibility with the particular characteristics of the underlying wall surface to which the pipe cover 3 is to be attached. For example, in the case where wall surface 304 is a concrete wall, anchor 328 and optional anchors 312 and 314 may desirably comprise suitable concrete anchors, such as commonly known expandable bolt, or bonded bolt or other mechanical concrete anchors, for example. In a particular embodiment, central anchor 328 and optional lateral anchors 312 and 314 may desirably be removable, so that pipe cover 3 may be removable from underlying wall surface 304 such as may be required for maintenance and/or replacement of pipes 322 and 324, or for relocating or removal of pipe cover 3 as may be required at some point after installation.

Figure 4:
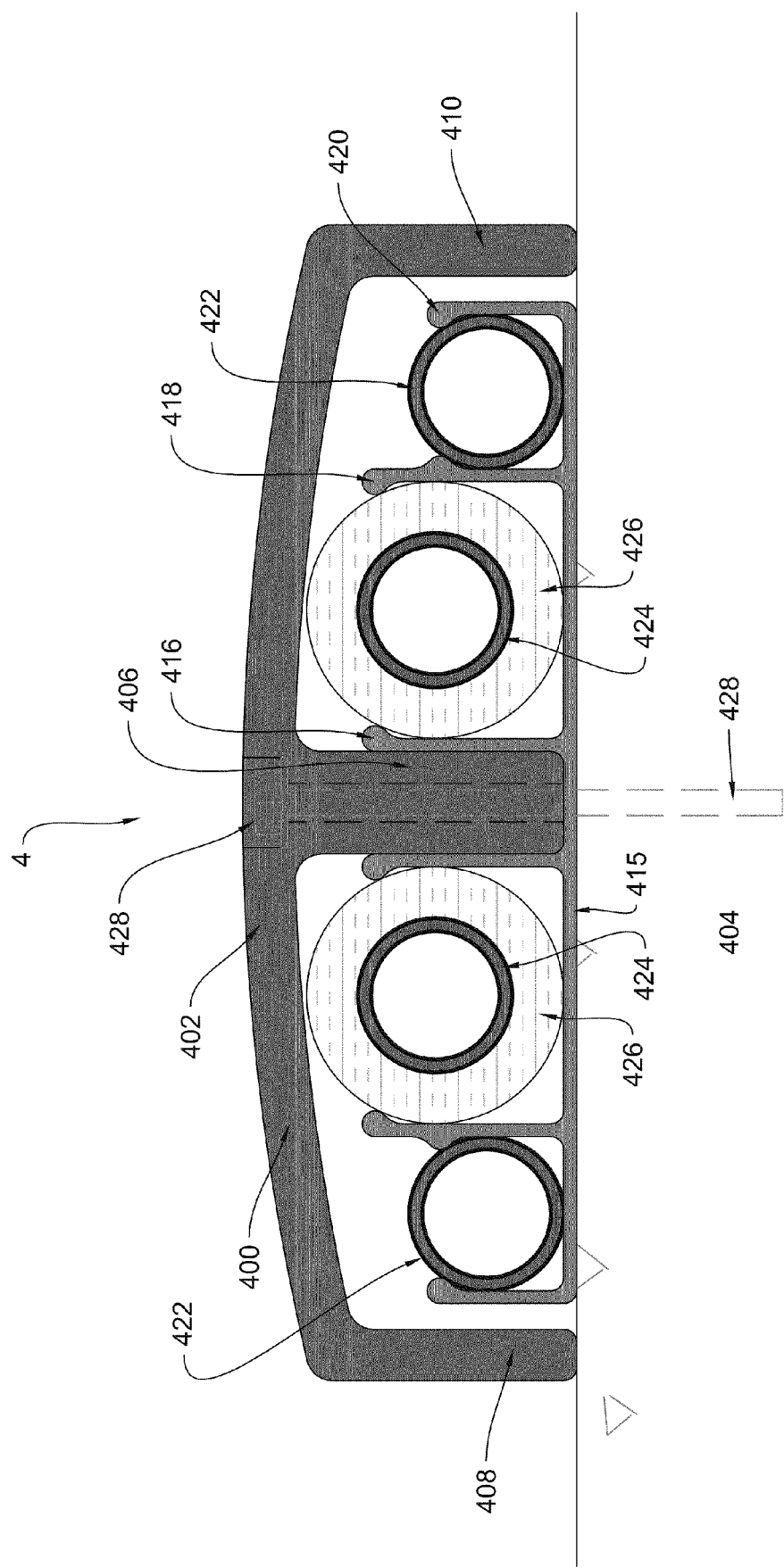
FIG. 4 illustrates a cross sectional view of a further exemplary pipe cover adapted for wall installation, according to an embodiment of the invention.

Referring now to FIG. 4, a cross sectional view of a further exemplary pipe cover adapted for wall installation, according to an embodiment of the invention, is shown. Similar to pipe cover 3 shown in FIG. 3, the pipe cover 4 of FIG. 4 comprises a load bearing cover element 400 which provides protection for multiple pipes, such as pipes 422 and 424 from impacts, loads and/or other forces applied to the pipe cover 4. The load bearing cover element 400 itself further comprises a substantially curved outer web member 402 extending between first and second lateral supports 408 and 410 which are located at either end of the load bearing cover element 400. Similar to pipe cover 3 described above, the pipe cover 4 embodiment illustrated in FIG. 4 is also desirably adapted for attachment to a wall or other substantially vertical and substantially planar underlying surface 404, such as exemplary concrete wall surface 404, such as may be used to protect pipes 422, 424 traversing vertically up or horizontally across a wall surface 404, for example. The first and second lateral supports 408 and 410 of the pipe cover 4 are adapted to bear against the surface of underlying concrete wall 404, to enable the transfer of impact forces and/or other loads applied to the load bearing cover element 400 to the underlying wall surface 404. Load bearing cover element 400 also comprises a central load bearing support 406 situated at substantially the center of substantially curved outer web 402. The central load bearing support 406 extends between the outer web 402 and the underlying concrete wall surface 404, and is operable to transfer impact forces and/or other loads applied to the outer web 402, to the underlying wall 404, and to support the outer web 402 when the pipe cover 4 is subject to impact or otherwise under load. The central support 406 also comprises at least one anchor 428 for securely attaching the pipe cover 4 to the underlying concrete wall 404. The pipe cover 4 further comprises at least one pipe support 415 which comprises multiple and desirably resilient pipe retainer clips such as 416, 418 and 420, to resiliently retain multiple pipes such as pipes 422 and 426 between the outer web member 402 and the underlying concrete wall surface 404

Similar to the pipe cover 3 as described above in reference to FIG. 3, pipe cover 4 desirably provides for protection of multiple pipes, such as pipes 422 and 424, from impact forces and other loads which may be applied to the load bearing cover element 400 in installations on a substantially vertical wall surface 404. Such impact forces on cover element 402 may arise from automobiles or other vehicles impacting or otherwise striking pipe cover 4, such as may occur in installations on interior or exterior walls of buildings or structures in vehicle parking lots, parkades, garages and/or warehouses, for example.

In a particular embodiment similar to as described above in reference to FIG. 3, pipe cover 4 may protect geothermal pipes 422, 424, which run vertically up or horizontally along a concrete building wall surface 404 such as a concrete interior or exterior wall of an existing building as may occur in retrofit geothermal heating, cooling and/or power generation applications where geothermal pipes 422, 424 run along a concrete wall of an underground, basement or parkade parking area within a building, or an exterior parking area directly adjacent to an exterior building wall surface, for example. In such geothermal piping applications, pipe support 415 may desirably comprise resilient pipe clips 416, 418 and 420 which are sized and spaced so as to provide secure resilient support to geothermal pipes 422 and 424 of differing external dimensions, such as may be due to internal pipe dimensions used, or to dimensions of external insulation layers such as insulation 426 on pipe 424, for example.

Similar to as described above in reference to FIG. 3, central anchor 428 may comprise any suitable known anchor means for securing pipe cover 4 to the underlying wall surface 404, and may desirably be selected for suitability and compatibility with the particular characteristics of the underlying wall surface to which the pipe cover 4 is to be attached. For example, in the case where wall surface 404 is a concrete wall, anchor 428 may desirably comprise suitable concrete anchors, such as commonly known expandable bolt, or bonded bolt or other mechanical concrete anchors, for example. In a particular embodiment, central anchor 428 may also desirably be removable, as described above in reference to FIG. 3.

Similar to as described above in reference to FIGS. 1 and 2, according to an embodiment of the invention, pipe covers 3 and 4 may each be individually provided in segments of any suitable or desired length, whereby the load bearing cover elements 300 and 400 extend the full length of the segment, so as to provide protection for pipes 322, 324, and 422, 424, respectively. In such embodiments, pipe supports 315 and 415 may each either extend the full length of the segment to provide continuous resilient retention of pipes 322, 324 and 422, 424 along the length of the segment, or may alternatively comprise one or more discontinuous sections within the length of the segment, so as to provide resilient retention of pipes 322, 324 and 422, 424 at suitable intervals along the length of the segment. Central anchors 328 and 428, and also optional lateral anchors 312 and 314 may each be provided at any desired interval along the length of pipe covers 3 and 4, such as one or more anchors per segment of pipe cover 3 or 4, for example, or as may be required or suitable to secure pipe covers 3 and 4 to the underlying wall surface 304 or 404 for a desired application. In a particular embodiment where pipe cover 3 or 4 is provided in segments, such segments may optionally comprise connection means (not shown) which may desirably be adapted to securely connect adjacent segments of each pipe cover 3 or 4 using any suitable known method of connection known in the art, such as but not limited to mechanical fasteners, interlocking tabs/slots or other locking arrangements, adhesive connection, for example. Alternatively, adjacent segments of each pipe cover 3 or 4 may be secured solely by its central anchor 328 or 428 (or optional lateral anchors 312 and 314 in the case of pipe cover 3) to the underlying wall surface 304 or 404, respectively.

Similar to as described above in reference to FIGS. 1 and 2, the components of pipe covers 3 and 4 may each be constructed from any known materials suitable for use in the protection of pipes 322, 324, and 422, 424. In an exemplary embodiment, the load bearing cover elements 300 and 400, including lateral supports 308, 310 and 408, 410, and central load bearing supports 306 and 406 may desirably comprise one or more durable and resilient materials such as, but not limited to plastic, high impact polyvinyl chloride, fiber-reinforced plastic, fiberglass-reinforced plastic, carbon-reinforced plastic, high density rubber, and steel, for example. Further, pipe supports 315 and 415 including pipe retainer clips 316, 318, 320 and 416, 418, 420, may desirably comprise one or more suitable resilient materials such as, but not limited to, plastic, polyvinyl chloride and metal, for example. In a particular embodiment, all components of each of the pipe covers 3 and 4, including cover elements 300 and 400, and pipe supports 315 and 415 may desirably be constructed from materials which are resistant to corrosion, salts and automotive fluids and chemicals, such as for applications such as in parkways, driveways, garages, parkades and other areas where vehicles travel or are stored.

Figure 5:
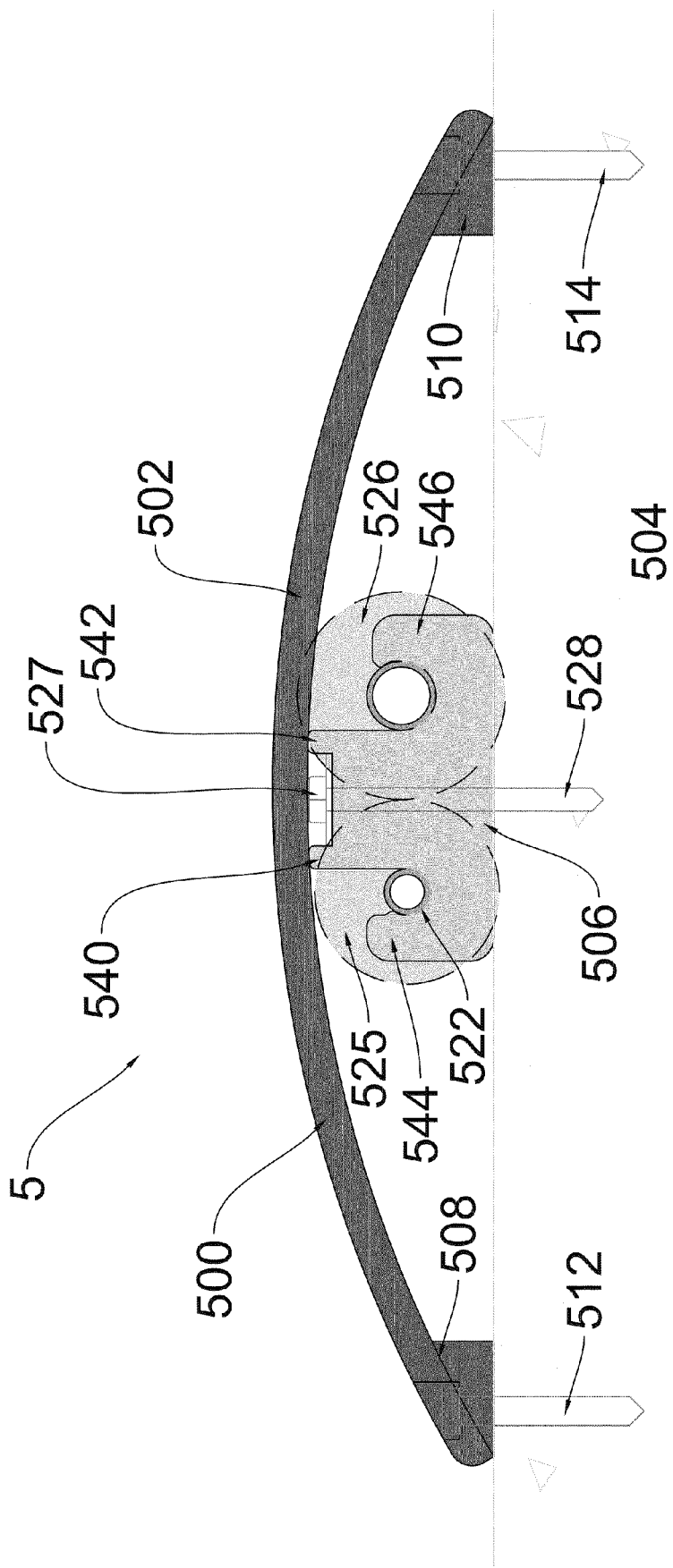
FIG. 5 illustrates a cross sectional view of an exemplary pipe cover with an integrated pipe support, according to an embodiment of the present invention.

Referring to FIG. 5, a cross sectional view of an exemplary pipe cover 5 with an integrated pipe support, according to an embodiment of the present invention, is shown. The pipe cover 5 comprises a load bearing cover element 500 which provides protection for multiple pipes, such as pipes 522 and 524 from impacts, loads and/or other forces applied to the pipe cover 5. The load bearing cover element 500 itself further comprises a curved outer web member 502 extending between first and second lateral supports 508 and 510 which are located at either end of the load bearing cover element 500. Similar to pipe cover 1 as described above in reference to FIG. 1, the pipe cover 5 illustrated in FIG. 5 is adapted for attachment to a substantially planar underlying surface, such as exemplary concrete surface 504. The first and second lateral supports 508 and 510 of the pipe cover 5 are adapted to bear against the underlying concrete surface 504, to enable the transfer of forces and loads applied to the load bearing cover element 500 to the underlying surface 504. Load bearing cover element 500 also comprises a central load bearing support 506 situated at substantially the center of curved outer web 502.

The central load bearing support 506 extends between the outer web 502 and the underlying concrete surface 504, and is operable to transfer loads, impacts and/or other forces applied to the outer web 502 of the cover element 500 to the underlying surface 504, and to support the outer web 502 while the pipe cover 5 is under load. The central load bearing support 506 additionally comprises web support flanges 540 and 542 which contact and bear against outer web 502 to provide support to the outer web 502 and to transfer forces from the outer web 502 to the underlying surface 504. The central load bearing support 506 further comprises at least one anchor 528 located centrally between the web support flanges 540 and 542, for securely attaching the pipe cover 5 and in particular the central load bearing support 506 to the underlying concrete surface 504. Central load bearing support 506 also comprises integrated pipe support clips 544 and 546 located on either side of the central support 506, for resiliently retaining pipes 522 and 524, respectively. Integrated pipe support clips 544 and 546 are desirably spaced laterally to either side of central anchor 528, and also spaced between outer web 502 and underlying surface 504 so as to resiliently support pipes 522 and 524 so that the pipes 522 and 524 are supported suspended between outer web 502 and underlying surface 504, and are not in direct contact with either the outer web 502 or underlying surface 504, thus desirably providing additional protection to pipes 522 and 524 from loads, impacts and/or other forces applied to cover element 500, for example.

Similar to as described above and shown in FIG. 1, in a particular embodiment according to the invention, at least one of lateral supports 508 and 510 may optionally include lateral anchor 512 or 514, respectively. Such lateral anchors 512 and 514 are operable to complement the centrally located anchor 528 for providing secure attachment of the pipe cover 5 to the underlying surface. Additionally, optional lateral anchors 512 and 514 may further desirably improve the transfer of loads, impacts and/or other forces applied to lateral supports 508 and 510 of load bearing cover element 502 to the underlying surface 504 and may also desirably reduce potential lateral flexing and/or shifting of pipe cover 5 such as when under load by wheeled vehicles or other loads rolling across pipe cover 5. Optional lateral anchors 512 and 514 may also be desirably recessed into lateral supports 508 and 510 so as to provide a substantially smooth curved outer surface of cover element 500, to additionally facilitate the smooth rolling of vehicle wheels over the pipe cover 5. In another similar embodiment, the head or bolt end 527 of central anchor 528 may also be desirably recessed below the outer surface of cover element 500 such as into central support 506 and between web support flanges 540, 542, for example.

Similar to the pipe cover 1 as described above in reference to FIG. 1, pipe cover 5 desirably provides for protection of multiple pipes, such as pipes 522 and 524, from impacts, loads and other forces which may be applied to the load bearing cover element 500 which is installed over a hard underlying surface 504, such as but not limited to concrete, asphalt or stone surfaces, for example. In many typical applications, the pipe cover 5 may protect pipes 522, 524 from impacts and/or loads or other forces such as may be applied to the load bearing cover element 500 by the passage of wheeled vehicles over top of the pipe cover 5, as may occur in a driveway, roadway, parking lot, parking garage, or on a surface within a building, for example, where vehicles may pass over or impact against the pipe cover 5.

In a particular embodiment similar to as described above in reference to FIG. 1, pipe cover 5 may protect geothermal pipes 522, 524, which run along a hard underlying surface 504 such as a concrete or asphalt surface, such as may occur in retrofit geothermal heating, cooling and/or power generation applications where geothermal pipes 522, 524 run through underground, basement or parkade parking areas within or adjacent to an existing building, or roadways or driveways adjacent to an existing building where vehicle traffic passes. In such geothermal piping applications, integrated pipe support clips 544 and 546 on central support 506 may desirably be sized and spaced so as to provide secure and resilient support to geothermal pipes 522 and 524 of differing external dimensions, such as may be due to internal pipe dimensions used, or to dimensions of external insulation layers such as insulation 525 and 526 on geothermal pipes 522 and 524, for example. It should be noted that as described above in reference to FIG. 1, the external dimensions of geothermal or other pipes 522 and 524 may vary significantly depending upon the application, as is known in the art, and therefore in any embodiments of the present invention, the overall dimensions of pipe cover 5 and all its elements may also be varied and scaled as required to provide cover and protection of pipes 522 and 524 located between the underlying surface 504 and the outer web 502 of pipe cover 5.

Similar to as described above in reference to FIG. 1, central anchor 528 and optional lateral anchors 512 and 514 may comprise any suitable known anchor means for securing pipe cover 5 to the underlying surface 504, and may desirably be selected for suitability and compatibility with the particular characteristics of the underlying surface to which the pipe cover 5 is to be attached, such as the use of suitable and commonly known expandable bolt, bonded bolt or other mechanical concrete anchors for attachment to a concrete surface 504, for example. In a particular embodiment, central anchor 528 and optional lateral anchors 512 and 514 may desirably be removable, so that pipe cover 5 may be removed from underlying surface 504 such as may be required for maintenance and/or replacement of pipes 522 and 524, or for relocating or removal of pipe cover 5 as may be required at some point after installation.

Figure 6:
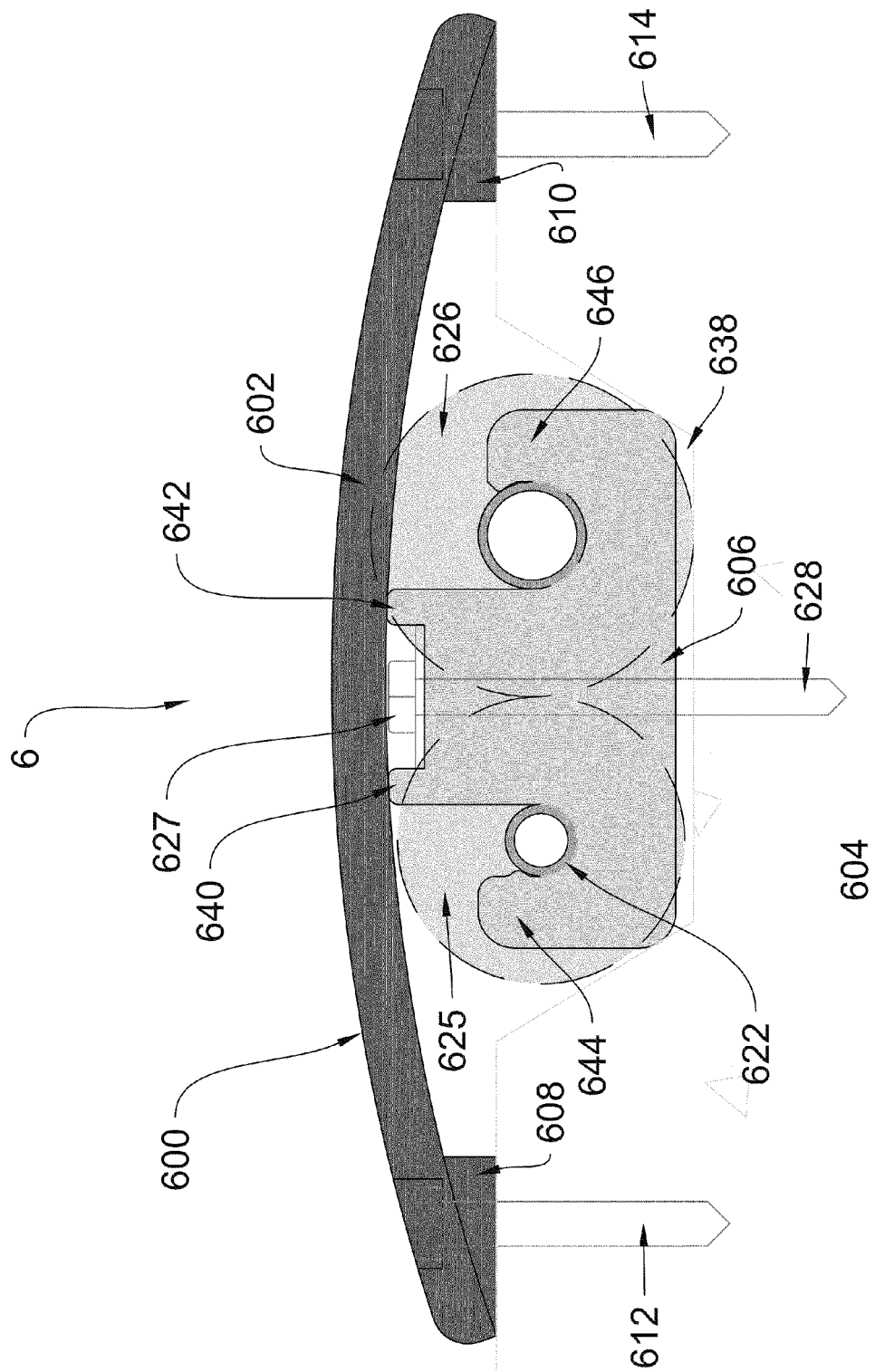
FIG. 6 illustrates a cross sectional view of an exemplary pipe cover with integrated pipe support adapted for installation in a recess of an underlying surface, according to an embodiment of the present invention.

Referring to FIG. 6, a cross sectional view of an exemplary pipe cover 6 with integrated pipe support and adapted for installation in a recess of an underlying surface according to an embodiment of the present invention, is shown. Similar to as described above in reference to pipe cover 2 in FIG. 2, the pipe cover 6 comprises a load bearing cover element 600 which provides protection for multiple pipes 622 and 624 from impacts, loads and/or other forces applied to the pipe cover 6. The load bearing cover element 600 itself further comprises a curved outer web member 602 extending between first and second lateral supports 608 and 610 which are located at either end of the load bearing cover element 600. Similar to pipe cover 2, the pipe cover 6 embodiment illustrated in FIG. 6 is adapted for attachment within a recess 638 in an otherwise substantially planar underlying surface 604, such as exemplary concrete surface 604. The first and second lateral supports 608 and 610 of the pipe cover 6 are adapted to bear against the surface of the underlying concrete surface 604, on either side of recess 638, to enable the transfer of forces and loads applied to the load bearing cover element 600 to the underlying surface 604 adjacent to the lateral supports 608 and 610. Load bearing cover element 600 also comprises a central load bearing support 606 situated at substantially the center of curved outer web 602.

Similar to as described above in reference to FIG. 5, the central load bearing support 606 extends between the outer web 602 and the underlying concrete surface 604, to transfer loads, impacts and/or other forces on outer web 602 to the underlying surface 604. The central load bearing support 606 additionally comprises web support flanges 640 and 642 which contact and bear against outer web 602 to support and to transfer forces from the outer web 602 to the underlying surface 604. The central load bearing support 606 further comprises at least one anchor 628 located centrally between the web support flanges 640 and 642, for securely attaching central support 606 to the underlying concrete surface 604. Central load bearing support 606 also comprises integrated pipe support clips 644 and 646 which are desirably spaced to either side of central anchor 628, and between outer web 602 and underlying surface 604 so as to resiliently support pipes 622 and 624 such that they are desirably not in direct contact with either the outer web 602 or underlying surface 604, thus desirably providing additional protection to pipes 622 and 624 from loads, for example.

Similar to the pipe cover 5 as described above in reference to FIG. 5, pipe cover 6 desirably provides for protection of pipes 622 and 624 from impacts, loads and other forces on load bearing cover element 600 in installations over a recess 638 in a hard underlying surface 604, such as but not limited to concrete, asphalt or stone surfaces, for example. In many typical applications, the pipe cover 6 may protect pipes 622 and 624 from impacts and/or loads or other forces such applied to the load bearing cover element 602 by the passage of wheeled vehicles over top of the pipe cover 6, as may occur in a driveway, roadway, parking lot, parking garage, or on a surface within a building, for example, where vehicles may pass over or impact against the pipe cover 6.

In a particular embodiment similar to as described above in reference to FIG. 5, pipe cover 6 may protect geothermal pipes 622 and 624, which run in a recess 638 in hard underlying surface 604, such as a concrete or asphalt surface, such as may occur in retrofit geothermal heating, cooling and/or power generation applications where geothermal pipes 622, 624 run through underground, basement or parkade parking areas within or adjacent to an existing building, or roadways or driveways adjacent to an existing building where vehicle traffic passes. Similar to as in pipe cover 5 in FIG. 5, in such geothermal applications, integrated pipe support clips 644 and 646 on central support 606 may desirably be sized and spaced so as to provide secure and resilient support to geothermal pipes 622 and 624 of differing external dimensions, such as may be due to internal pipe dimensions, or to dimensions of external insulation layers such as insulation 625 and 626 on geothermal pipes 622 and 624, for example. It should be noted that as described above in reference to FIGS. 1-5, the external dimensions of geothermal or other pipes 622 and 624 may vary significantly depending upon the application, as is known in the art, and therefore in any embodiments of the present invention, the overall dimensions of pipe cover 6 and all its elements may also be varied and scaled as required to provide cover and protection of pipes 622 and 624 located between the underlying surface 604 and the outer web 602 of pipe cover 6.

Similar to as described above in reference to FIG. 5, central anchor 628 and optional lateral anchors 612 and 614 may comprise any suitable known anchor means for securing pipe cover 6 to the underlying surface 604, and may desirably be selected for suitability and compatibility with the particular characteristics of the underlying surface to which the pipe cover 6 is to be attached, such as the use of suitable and commonly known expandable bolt, bonded bolt or other mechanical concrete anchors for attachment to a concrete surface 604, for example. In a particular embodiment, central anchor 628 and optional lateral anchors 612 and 614 may desirably be removable, so that pipe cover 6 may be removed from underlying surface 604 such as may be required for maintenance and/or replacement of pipes 622 and 624, or for relocating or removal of pipe cover 6 as may be required at some point after installation.

Similar to as described above in reference to FIGS. 1 and 2, according to an embodiment of the invention, pipe covers 5 and 6 may each be individually provided in segments of any suitable or desired length, whereby the load bearing cover elements 500 and 600 extend the full length of the segment, so as to provide protection for pipes 522, 524, and 622, 624, respectively. In such embodiments, integrated pipe support clips 544, 546 and 644, 646 components of central load bearing supports 506 and 606 may either extend the full length of the segment to provide continuous resilient retention of pipes 522, 524 and 622, 624 along the length of the segment, or may alternatively comprise one or more discontinuous pipe retainer clip sections within the length of the segment, so as to provide resilient retention of pipes 522, 524 and 622, 624 at suitable intervals along the length of the segment. Central anchors 528 and 628, and also optional lateral anchors 512, 514 and 612, 614 may each be provided at any desired interval along the length of pipe covers 5 and 6, such as one or more anchors per segment of pipe cover 5 or 6, for example, or as may be required or suitable to secure pipe covers 5 and 6 to the underlying surfaces 504 and 604 for a desired application. In a particular embodiment where pipe cover 5 or 6 is provided in segments, such segments may optionally comprise connection means (not shown) which may desirably be adapted to securely connect adjacent segments of each pipe cover 5 or 6 using any suitable known method of connection known in the art, such as but not limited to mechanical fasteners, interlocking tabs/slots or other locking arrangements, adhesive connection, for example. Alternatively, adjacent segments of each pipe cover 5 or 6 may be secured solely by its central anchor 528 or 628 (and/or optional lateral anchors 512, 514 or 612, 614) to the underlying surface 504 or 604, respectively.

Similar to as described above in reference to FIGS. 1 and 2, the components of pipe covers 5 and 6 may each be constructed from any known materials suitable for use in the protection of pipes 522, 524, and 622, 624. In an exemplary embodiment, the load bearing cover elements 502 and 602, including lateral supports 508, 510 and 608, 610, and central load bearing supports 506 and 606 may desirably comprise one or more durable and resilient materials such as, but not limited to plastic, high impact polyvinyl chloride, fiber-reinforced plastic, fiberglass-reinforced plastic, carbon-reinforced plastic, high density rubber, and steel, for example. Further, pipe retaining clips 544, 546 and 644, 646 may desirably comprise one or more suitable resilient materials such as, but not limited to, plastic, rubber, elastomer, polyvinyl chloride and metal, for example. In a particular embodiment, all components of each of the pipe covers 5 and 6 may desirably be constructed from materials which are resistant to corrosion, salts and automotive fluids and chemicals, such as for applications such as in parkways, driveways, garages, parkades and other areas where vehicles travel or are stored.

Figure 7:
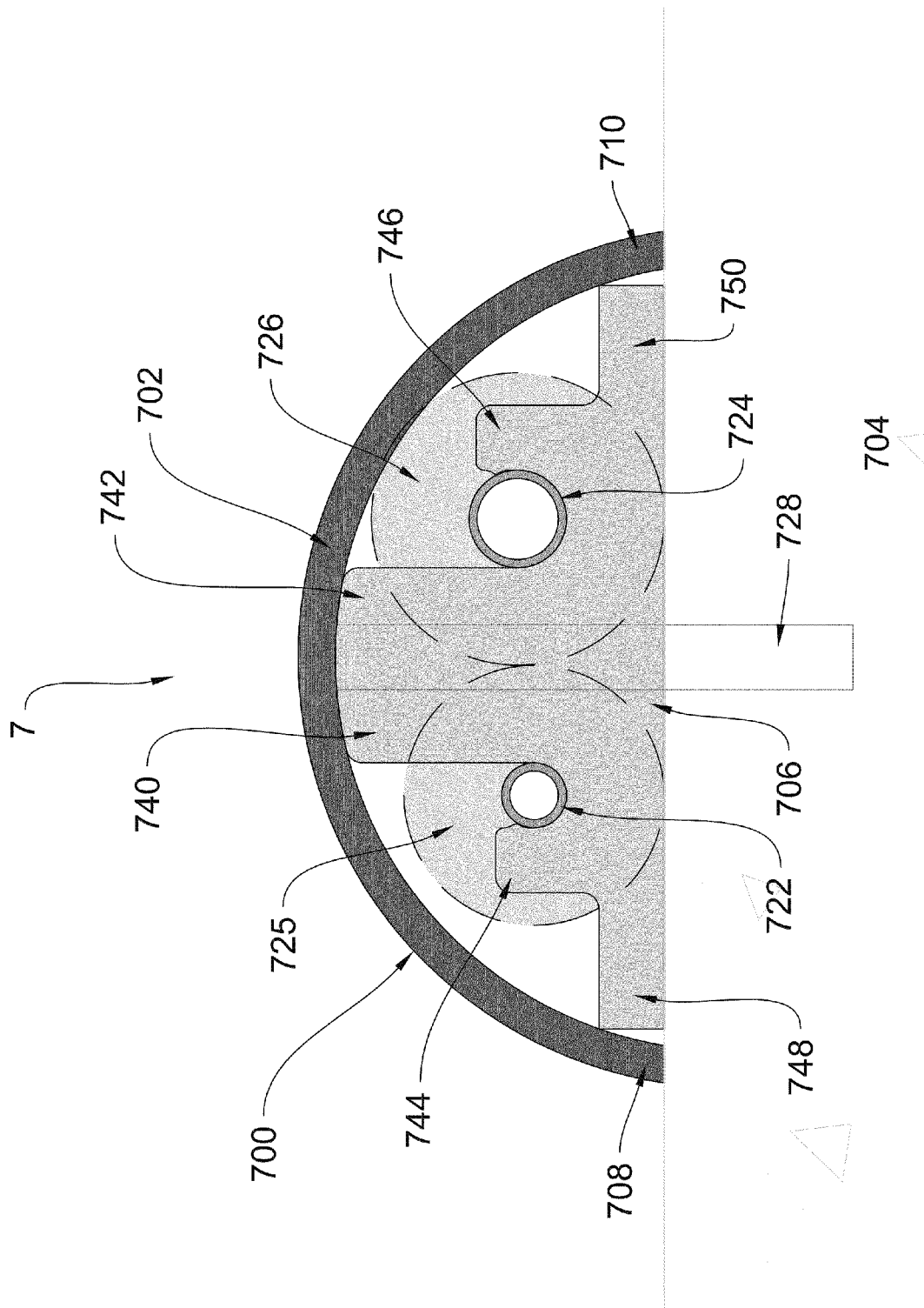
FIG. 7 illustrates a cross sectional view of an exemplary pipe cover with integrated pipe support adapted for wall installation, according to an embodiment of the present invention.

Referring now to FIG. 7, a cross sectional view of an exemplary pipe cover with integrated pipe support adapted for wall installation according to an embodiment of the present invention, is shown. Similar to pipe cover 4 shown in FIG. 4, the pipe cover 7 of FIG. 7 comprises a load bearing cover element 700 which provides protection for pipes 722 and 724 from impacts, loads and/or other forces applied to the pipe cover 7. The load bearing cover element 700 itself further comprises a curved outer web member 702 extending between first and second lateral supports 708 and 710 which are located at either end of the load bearing cover element 700. Similar to pipe cover 4 described above, the pipe cover 7 embodiment illustrated in FIG. 7 is also desirably adapted for attachment to a wall or other substantially vertical and substantially planar underlying surface 704, such as exemplary concrete wall surface 704, such as may be used to protect pipes 722 and 724 traversing vertically up or horizontally across a wall surface 704, for example. The first and second lateral supports 708 and 710 of the pipe cover 7 are adapted to bear against the surface of underlying concrete wall 704, to enable the transfer of impact forces and/or other loads applied to the load bearing cover element 700 to the underlying wall surface 704. Load bearing cover element 700 also comprises a central load bearing support 706 situated at substantially the center of curved outer web 702.

The central load bearing support 706 extends between the outer web 702 and the underlying concrete wall surface 604, to transfer impact forces and/or other loads applied to the outer web 702, to the underlying wall 704. The central load bearing support 706 additionally comprises web support flanges 740 and 742 which contact and bear against outer web 702 to support and to transfer forces from the outer web 702 to the underlying wall surface 704. The central load bearing support 706 further comprises at least one anchor 728 located centrally between the web support flanges 740 and 742, for securely attaching pipe cover 7, including cover element 700 and central support 706, to the underlying concrete wall surface 704. Central load bearing support 706 also comprises integrated pipe support clips 744 and 746 which are desirably spaced to either side of central anchor 728, and between outer web 702 and underlying wall 704 so as to resiliently support pipes 722 and 724 so that they are desirably not in direct contact with either the outer web 702 or underlying wall 704, thus desirably providing additional protection to pipes 722 and 724 from impacts, for example. Central load bearing support 706 also comprises lateral flanges 748 and 750 which may desirably bear against lateral supports 708 and 710 of cover element 700, respectively. Lateral flanges 748 and 750 of central load bearing support 706 may thereby desirably provide additional support for cover element 700, particularly in the area of lateral supports 708 and 710.

Similar to the pipe cover 4 as described above in reference to FIG. 4, pipe cover 7 desirably provides for protection of pipes 722 and 724, from impact forces and other loads which may be applied to the load bearing cover element 700 in installations on a substantially vertical wall surface 704. Such impact forces on cover element 702 may arise from automobiles or other vehicles impacting or otherwise striking pipe cover 7, such as may occur in installations on interior or exterior walls of buildings or structures in vehicle parking lots, parkades, garages and/or warehouses, for example.

In a particular embodiment similar to as described above in reference to FIG. 4, pipe cover 7 may protect geothermal pipes 722, 724, which run vertically up or horizontally along a concrete building wall surface 704 such as a concrete interior or exterior wall of an existing building as may occur in retrofit geothermal heating, cooling and/or power generation applications where geothermal pipes 722 and 724 run along a concrete wall of an underground, basement or parkade parking area within a building, or an exterior parking area directly adjacent to an exterior building wall surface, for example. In such geothermal applications, integrated pipe support clips 744 and 746 on central support 706 may desirably be sized and spaced so as to provide secure and resilient support to geothermal pipes 722 and 724 of differing external dimensions, such as may be due to internal pipe dimensions, or to dimensions of external insulation layers such as insulation 725 and 726 on geothermal pipes 722 and 724, for example. It should be noted that as described above in reference to FIGS. 1-5, the external dimensions of geothermal or other pipes 722 and 724 may vary significantly depending upon the application, as is known in the art, and therefore in any embodiments of the present invention, the overall dimensions of pipe cover 7 and all its elements may also be varied and scaled as required to provide cover and protection of pipes 722 and 724 located between the underlying surface 704 and the outer web 702 of pipe cover 7. In a further embodiment, geothermal pipes 722 and 724, optionally also including insulation layers 725 and 726 respectively, may have different external diameters. In such case, central load bearing support 706 may be located eccentrically, or off-center with respect to anchor 728, such as to more efficiently fit the outer diameters of geothermal pipes 722 and 724 between underlying wall surface 704 and cover element 700, for example.

Similar to as described above in reference to FIG. 4, anchor 728 may comprise any suitable known anchor means for securing pipe cover 7 to the underlying wall surface 704, and may desirably be selected for suitability and compatibility with the particular characteristics of the underlying wall surface to which the pipe cover 7 is to be attached. For example, in the case where wall surface 704 is a concrete wall, anchor 728 may desirably comprise suitable concrete anchors, such as commonly known expandable bolt, or bonded bolt or other mechanical concrete anchors, for example. In a particular embodiment, central anchor 728 may also desirably be removable, as described above in reference to FIGS. 3 and 4.

Similar to as described above in reference to FIG. 4, according to an embodiment of the invention, pipe cover 7 may be provided in segments of any suitable or desired length, whereby the load bearing cover element 700 extends the full length of the segment, so as to provide protection for pipes 722 and 724. In such an embodiment, integrated pipe support clips 744 and 746 of central load bearing support 706 may either extend the full length of the segment to provide continuous resilient retention of pipes 722 and 724 along the length of the segment, or may alternatively comprise one or more discontinuous pipe retainer clip sections within the length of the segment, so as to provide resilient retention of pipes 722 and 724 at suitable intervals along the length of the segment. Anchor 728 may be provided at any desired interval along the length of pipe cover 7, such as one or more anchors 728 per segment of pipe cover 7, for example, or as may be required or suitable to secure pipe cover 7 to the underlying wall 704 for a desired application. In a particular embodiment where pipe cover 7 is provided in segments, such segments may optionally comprise connection means (not shown) which may desirably be adapted to securely connect adjacent segments of each pipe cover 7, as described above in reference to FIG. 4, for example.

Similar to as described above in reference to FIG. 4, the components of pipe cover 7 may be constructed from any known materials suitable for use in the protection of pipes 722 and 724. In an exemplary embodiment, the components of load bearing cover element 700 may desirably comprise one or more durable and resilient materials such as, but not limited to plastic, high impact polyvinyl chloride, fiber-reinforced plastic, fiberglass-reinforced plastic, carbon-reinforced plastic, high density rubber, and steel, for example. Further, pipe retaining clips 744 and 746 may desirably comprise one or more suitable resilient materials such as, but not limited to, plastic, rubber, elastomer, polyvinyl chloride and metal, for example. In a particular embodiment, all components of pipe cover 7 may desirably be constructed from materials which are resistant to corrosion, salts and automotive fluids and chemicals, such as for applications such as in parkways, driveways, garages, parkades and other areas where vehicles travel or are stored.

It should be noted that according to a general embodiment of the present invention, any of the above-described embodiments of pipe covers according to the invention may alternatively be used to retain, cover and protect other substantially linear components, such as conduits, cables including data, telephone, electrical and fiber optic cables, hoses, wires, or tubing for example, in place of the exemplary pipes described above in reference to FIGS. 1-7.

According to a further general embodiment of the present invention, any of the above-described embodiments of pipe covers according to the invention may further comprise one or more drainage notches extending laterally across the width of the pipe cover and substantially adjacent to the underlying surface, to allow for drainage of water or other runoff which may otherwise accumulate behind the pipe cover. Such drainage notches may desirably be incorporated at suitable intervals along the length of the pipe cover as may be required by the particular application and anticipated need for drainage.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. A pipe cover apparatus for mounting to a surface comprising:
   a load bearing cover element comprising first and second lateral load bearing supports, a curved outer web extending between said first and second lateral supports, and a central load bearing support located substantially centrally between said first and second lateral supports and extending between said outer web and said surface, said central load bearing support comprising at least one anchor for attachment to said surface; and
   a pipe support comprising first and second pipe retainer clips for resiliently retaining first and second pipes, wherein said pipe support is situated between said outer web and said surface and is retained by said at least one anchor;
   wherein said first and second lateral load bearing supports are adapted to bear against said surface.

2. The pipe cover apparatus according to claim 1, wherein said surface comprises a surface selected from the list comprising: a concrete surface, an asphalt surface and a stone surface.

3. The pipe cover apparatus according to claim 2, wherein said at least one anchor comprises an anchor selected from the list comprising: a concrete anchor, an asphalt anchor and a stone anchor.

4. The pipe cover apparatus according to claim 1 wherein at least one of said first and second lateral load bearing supports additionally comprises at least one anchor for attachment to said surface.

5. The pipe cover apparatus according to claim 1 wherein said pipe cover apparatus is adapted for mounting to a recess in a surface; wherein said first and second lateral supports are adapted to bear against said surface and wherein said central load bearing support extends between said outer web and said recess in said surface.

6. The pipe cover apparatus according to claim 1 wherein said load bearing cover element additionally comprises at least one auxiliary load bearing support situated between said central support and at least one of said first and second lateral supports, wherein said at least one auxiliary load bearing support extends between said outer web and said surface.

7. The pipe cover apparatus according to claim 6 wherein said load bearing cover element comprises first and second auxiliary load bearing supports, wherein said first auxiliary load bearing support is situated between said central support and said first lateral support, and wherein said second auxiliary load bearing support is situated between said central support and said second lateral support.

8. The pipe cover apparatus according to claim 1 wherein said pipe support comprises first, second, third and fourth pipe retainer clips for resiliently retaining corresponding first, second, third and fourth pipes between said outer web and said surface.

9. The pipe cover apparatus according to claim 1 wherein at least a portion of said load bearing cover element comprises a material selected from the list comprising: plastic, high impact polyvinyl chloride, fiber-reinforced plastic, fiberglass-reinforced plastic, carbon-reinforced plastic, high density rubber, and steel.

10. The pipe cover apparatus according to claim 1 wherein at least a portion of said pipe support comprises a material selected from the list comprising: plastic, polyvinyl chloride and metal.

11. A pipe cover apparatus for mounting to a surface comprising:
    a load bearing cover element comprising first and second lateral load bearing supports, a curved outer web extending between said first and second lateral supports, and a central load bearing support located substantially centrally between said first and second lateral supports and extending between said outer web and said surface;
    wherein said central load bearing support comprises: at least one anchor for attachment to said surface; and first and second pipe retainer clips for resiliently retaining first and second pipes situated between said outer web and said surface wherein said first and second pipe retainer clips are retained by said at least one anchor; and
    wherein said first and second lateral load bearing supports are adapted to bear against said surface.

12. The pipe cover apparatus according to claim 11, wherein said surface comprises a surface selected from the list comprising: a concrete surface, an asphalt surface and a stone surface.

13. The pipe cover apparatus according to claim 12, wherein said at least one anchor comprises an anchor selected from the list comprising: a concrete anchor, an asphalt anchor and a stone anchor.

14. The pipe cover apparatus according to claim 11 wherein at least one of said first and second lateral load bearing supports additionally comprises at least one anchor for attachment to said surface.

15. The pipe cover apparatus according to claim 11 wherein said pipe cover apparatus is adapted for mounting to a recess in a surface; wherein said first and second lateral supports are adapted to bear against said surface and wherein said central load bearing support extends between said outer web and said recess in said surface.

16. The pipe cover apparatus according to claim 11 wherein said central load bearing support comprises first and second web support flanges, wherein said first and second web support flanges contact said outer web.

17. The pipe cover apparatus according to claim 16 wherein said central load bearing support additionally comprises an anchor recess situated between said first and second web support flanges, and wherein said at least one anchor is seated in said anchor recess.

18. The pipe cover apparatus according to claim 11 wherein said first pipe retainer clip is adapted to resiliently retain a first pipe having a first diameter, and said second pipe retainer clip is adapted to resiliently retain a second pipe having a second diameter, wherein said first diameter differs from said second diameter.

19. The pipe cover apparatus according to claim 11 wherein at least a portion of said load bearing cover element comprises a material selected from the list comprising: plastic, high impact polyvinyl chloride, fiber-reinforced plastic, fiberglass-reinforced plastic, carbon-reinforced plastic, high density rubber, and steel.

20. The pipe cover apparatus according to claim 11 wherein at least a portion of said first and second pipe retainer clips comprise a material selected from the list comprising: plastic, rubber, elastomer, polyvinyl chloride and metal.

* * * * *